United States Patent
Patil et al.

(10) Patent No.: US 12,177,113 B2
(45) Date of Patent: Dec. 24, 2024

(54) SLICE-BASED RECOVERY AND CONVERGENCE

(71) Applicant: Verizon Patent and Licensing Inc., Basking Ridge, NJ (US)

(72) Inventors: Sudhakar Reddy Patil, Flower Mound, TX (US); David Taft, Keller, TX (US); Nicklous D. Morris, Trophy Club, TX (US); Luay Jalil, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 338 days.

(21) Appl. No.: 17/701,945

(22) Filed: Mar. 23, 2022

(65) Prior Publication Data

US 2023/0308385 A1 Sep. 28, 2023

(51) Int. Cl.
*H04L 45/28* (2022.01)
*H04L 47/24* (2022.01)
*H04W 24/04* (2009.01)

(52) U.S. Cl.
CPC ............. *H04L 45/28* (2013.01); *H04L 47/24* (2013.01); *H04W 24/04* (2013.01)

(58) Field of Classification Search
CPC ....... H04L 45/28; H04L 47/24; H04L 45/121; H04L 45/24; H04L 45/302; H04W 24/04; H04W 40/12; H04W 16/02; H04W 40/02
See application file for complete search history.

(56) References Cited

U.S. PATENT DOCUMENTS

| | | | | |
|---|---|---|---|---|
| 2015/0155969 A1* | 6/2015 | Volvovski | ............. | H03M 13/29 714/776 |
| 2020/0260330 A1* | 8/2020 | Zhu | ........................ | H04W 28/16 |
| 2023/0209437 A1* | 6/2023 | Mody | ................... | H04W 40/02 370/230 |
| 2023/0421480 A1* | 12/2023 | Pang | ....................... | H04L 45/04 |

OTHER PUBLICATIONS

WO_2022188530_A1_I (Year: 2022).*

* cited by examiner

*Primary Examiner* — Rushil P. Sampat

(57) ABSTRACT

A method may include identifying network slices associated with transmitting data in a network and determining, by a routing device, that a failure associated with a path used to transmit data has occurred. The method may also include determining, by the routing device, whether the failure is associated with one of the plurality of network slices. The method may further include prioritizing, by the routing device, a route selection process in response to determining that the failure is associated with one of the plurality of network slices.

20 Claims, 6 Drawing Sheets

SLICE-BASED RECOVERY AND CONVERGENCE

BACKGROUND INFORMATION

The concept of network slices within Fifth Generation (5G) networks is one of the benefits of 5G. Slices may be associated with particular metrics, such as latency and fast convergence. However, when failures occur in a transport network used to forward data traffic, such as an Internet protocol (IP) transport network, routing traffic via the slice may be adversely affected. For example, traffic routing, traffic engineering and path selection associated with re-routing traffic after a failure may affect the latency and other metrics associated with the slice in which a failure has been detected.

DETAILED DESCRIPTION OF EXAMPLE EMBODIMENTS

The following detailed description refers to the accompanying drawings. The same reference numbers in different drawings may identify the same or similar elements.

Implementations described herein provide for slice awareness in a network used to route traffic, such as transport network coupled to a radio access network (RAN) and a core network (e.g., a 5G network). A service provider associated with the RAN, transport network, and/or core network may provide service level agreements (SLAs) to particular entities or users that send/receive data via the network. When a failure occurs in a path associated with a network slice, network elements in the network may prioritize network recovery and convergence associated with re-routing of traffic to maintain the particular SLA associated with the slice. In one implementation, routers and/or other network devices in the transport network associated with routing data are notified of slices and corresponding priorities for the slices. Thereafter, when a failure or other problem occurs in a router or path associated with a slice, the router may prioritize the identification and installation of an alternate path via which to transmit data. The alternate path information may also be communicated to other routers in the transport network such that convergence with respect to routing information may be provided to all the routers in the network. In this manner, slice information and/or SLA requirements may be taken into consideration during network recovery and convergence-related processing.

Figure 1:
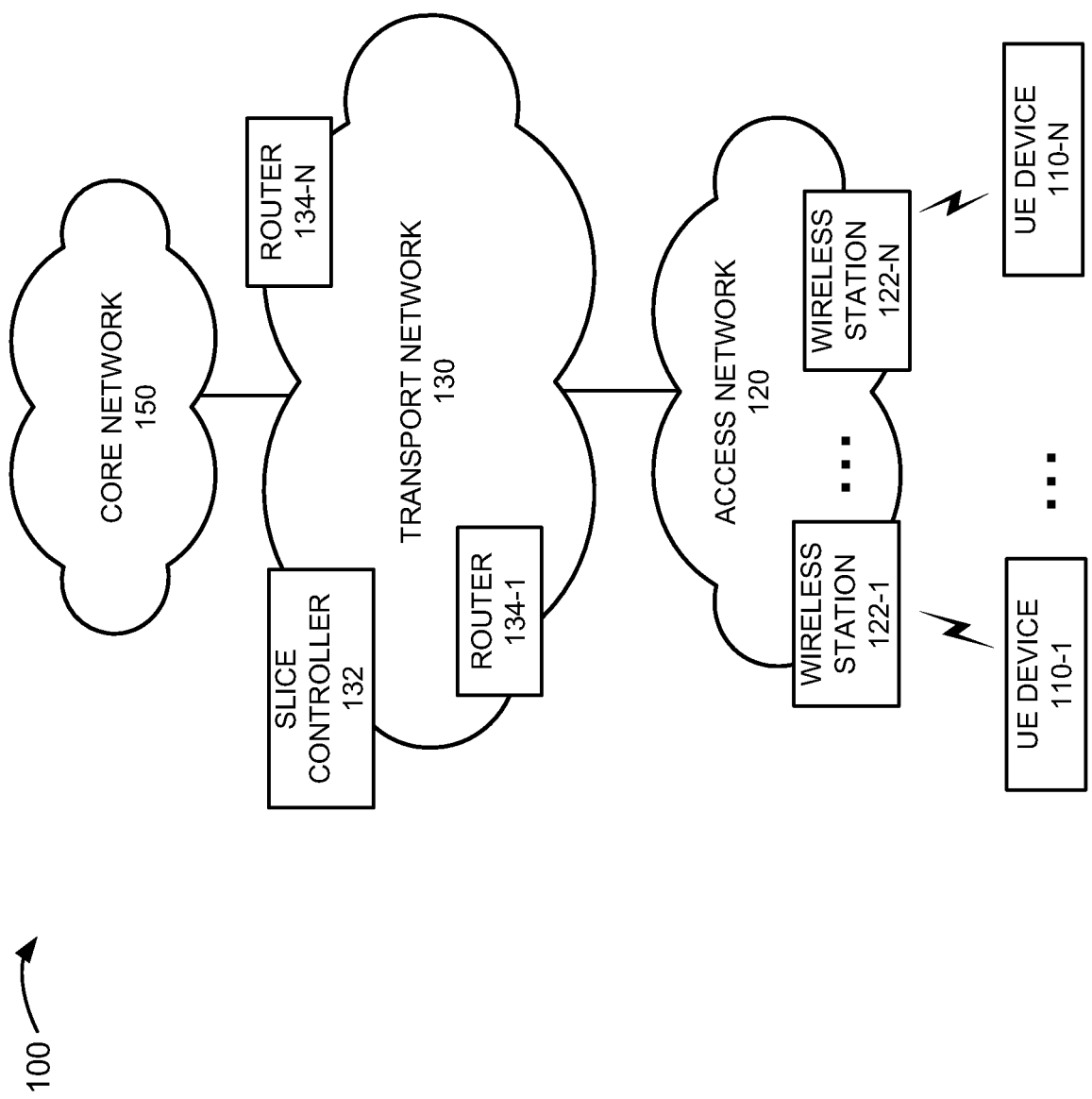
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes user equipment (UE) device 110-1 through 110-N, access network 120, wireless stations 122-1 through 122-N, transport network 130, slice controller 132, routers 134-1 to 134-N and core network 150.

UE devices 110-1 and 110-2 (referred to herein individually as UE device or UE 110, and collectively as UE devices 110) may include any computing device, such as a personal computer (PC), a laptop computer, a server, a tablet computer, a notebook, a Chromebook®, a mobile device, such as wireless or cellular telephone device (e.g., a conventional cell phone with data processing capabilities), a smart phone, a personal digital assistant (PDA) that can include a radio-telephone, any type of mobile computer device or system, a game playing device, a music playing device, a home appliance device, a home monitoring device, a virtualized system, etc., that includes communication functionality. UE device 110-1 may connect to access network 120 via wireless station 122-1 and UE device 110-N may connect to access network 120 via wireless station 122-N. UE devices 110 may also connect to other devices in environment 100 via any conventional technique, such as wired, wireless, optical connections or a combination of these techniques. UE device 110 and the person associated with UE device 110 (e.g., the party holding or using UE device 110) may be referred to collectively as UE device 110 in the description below.

Access network 120 may provide access to transport network 130 for wireless devices, such as UE devices 110. Access network 120 may enable UE device 110 to connect to core network 150 for Internet access, non-Internet Protocol (IP) data delivery, cloud computing, mobile telephone service, Short Message Service (SMS) message service, Multimedia Message Service (MMS) message service, and/or other types of data services. Access network 120 may provide access to core network 150, a service or application layer network, a cloud network, a multi-access edge computing (MEC) network, a fog network, etc. Furthermore, access network 120 may enable a device in core network 150 to exchange data with UE device 110 using a non-IP data delivery method such as Data over Non-Access Stratum (DoNAS).

Access network 120 may also include a 5G access network or another advanced network, such as a Fourth Generation (4G) access network. Additionally access network 120 may include functionality such as a mmWave Radio Access Network (RAN). Access network 120 may also support advanced or massive multiple-input and multiple-output (MIMO) antenna configurations (e.g., an 8×8 antenna configuration, a 16×16 antenna configuration, a 256×256 antenna configuration, etc.); cooperative MIMO (CO-MIMO); carrier aggregation; relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality.

Wireless stations 122 (referred to collectively as wireless stations 122 and individually as wireless station 122) may be included in access network 120. Each wireless station 122 may service a number of UE devices 110 and/or other user devices when the particular device is within radio frequency range of wireless station 122. In one implementation, wireless station 122 may include 5G base station (e.g., a next generation NodeB (gNB)) that includes one or more radio frequency (RF) transceivers. For example, wireless station 122 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams. For example, wireless station 122 may include a massive multiple-input, multiple-output (mMIMO) configuration (e.g., an 8×8 antenna configuration, a 16×16 antenna configuration, a 256×256 antenna configuration, etc.) to allow for multiple transmissions to be sent to UE devices 110 in sequence or simultaneously. In other implementations, wireless station 122 may also include a 4G base station (e.g., an evolved NodeB (eNodeB)) or a 6G base station that communicates wirelessly with UEs 110 located within the radio frequency range of wireless station 122.

Transport network 130 may be associated with a service provider that provides UE devices 110 with access to core network 150. For example, transport network 130 may couple access network 120 to core network 150 and may include one or more wired, wireless and/or optical networks that are capable of receiving and transmitting information (e.g., voice and/or video signals/data). For example, transport network 130 may include one or more Ethernet networks, packet switched networks such as Internet Protocol/Multi-Protocol Label Switching (IP/MPLS) networks, Software Defined Networks (SDNs) or other type of packet networks. Transport network 130 may also include one or more satellite networks, one or more packet switched networks, such as an IP based network, a local area network (LAN), a personal area network (PAN), a WiFi network, a Bluetooth network, a wide area network (WAN), a 5G network, a 4G LTE network, a 4G LTE Advanced network, a 6G network, an intranet, the Internet, or another type of network that is capable of transmitting signals/data. Transport network 130 may provide packet-switched services to UE devices 110 to provide, for example, data, voice, and/or multimedia services.

In one implementation, transport network 130 may include slice controller 132 and routers 134-1 through 134-N. Although only one slice controller 132 and two routers 134 are shown for simplicity, it should be understood that transport network 130 may include a large number (e.g., dozens or more) of slice controllers 132 and a large number (thousands or more) routers 134. For example, in some implementations, a number of slice controllers 132 may be geographically distributed in environment 100 to provide slice-related information to geographically distributed routers 134 very quickly.

Slice controller 132 may store information regarding slices implemented in environment 100. For example, slice controller 132 may store slice identifiers (IDs) along with SLA, quality of service (QoS), key performance indicators (KPIs), etc., associated with slices in environment 100. The term "slice" or "network slice" as used herein refers to a logical network including a portion of an access network (e.g., a portion of access network 120), a portion of a transport network (e.g., a portion of transport network 130) and a portion of a core network (e.g., a portion of core network 150) that provides telecommunication services and network capabilities that can vary from slice to slice. Each network slice may be associated with a different type of services having different characteristics and requirements (e.g., latency, jitter, bandwidth, etc.). A service provider may provision network slices to UE devices 110 to provide network connectivity and data services for UE devices 110, as described in detail below.

Slice controller 132 may communicate the slice information to routers 134 to enable the routers to prioritize the establishment of alternate paths and/or routes when a failure occurs, as described below. The slice information may be transmitted to routers 134 via a transmission control protocol to enable all routers 134 in transport network 130 to receive the slice information.

Core network 150 may include one or more wired, wireless and/or optical networks that are capable of receiving and transmitting data, voice and/or video signals. For example, network 150 may include one or more public switched telephone networks (PSTNs) or other type of switched network. Core network 150 may further include one or more satellite networks, one or more packet switched networks, such as an IP-based network, a software defined network (SDN), a local area network (LAN), a WiFi network, a Bluetooth network, a wide area network (WAN), a wireless WAN (WWAN), a 5G network, a 4G LTE Advanced network, a 6G network, an intranet, or another type of network that is capable of transmitting data. Network 150 may also include a core network that provides packet-switched services and wireless IP connectivity to various components in environment 100, such as UE devices 100, to provide, for example, data, voice, and/or multimedia services.

The exemplary configuration illustrated in FIG. 1 is provided for simplicity. It should be understood that a typical environment may include more or fewer devices than illustrated in FIG. 1. For example, environment 100 may include a large number (e.g., thousands or more) of UE devices 110 and wireless stations 122, controllers 132 and routers 134, as well as multiple transport networks 130 that connect UE devices 110 to core network 150. Environment 100 may also include elements, such as gateways, monitoring devices, network elements/functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
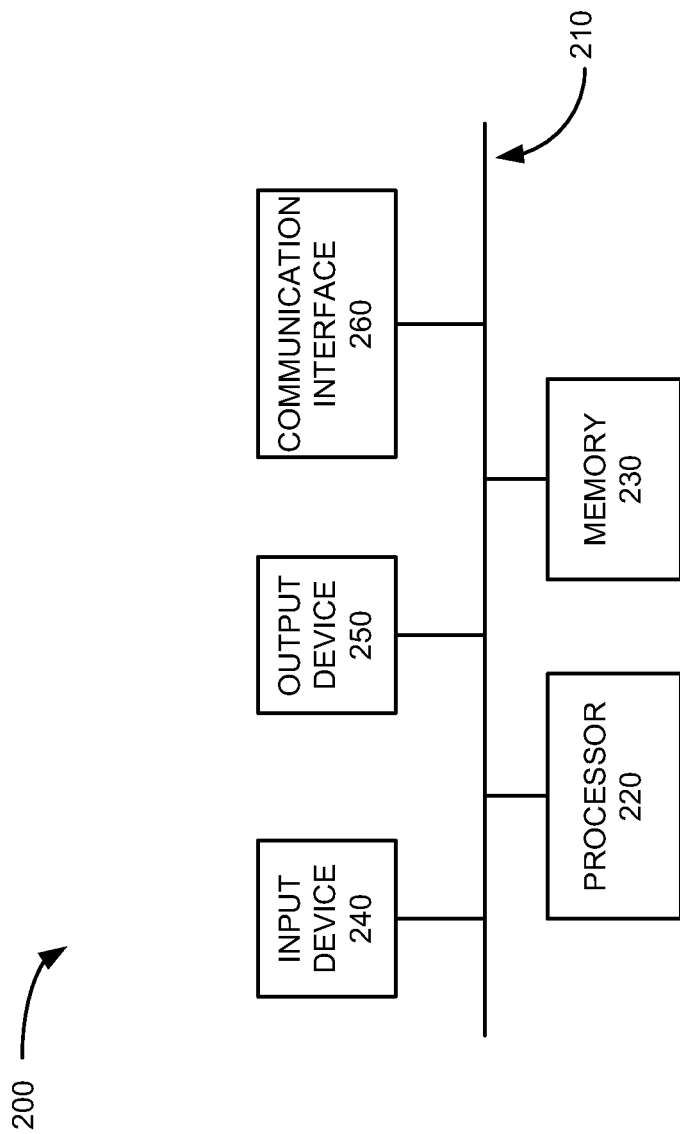
FIG. 2 is a block diagram of components implemented in one or more of the elements of the environment of FIG. 1 in accordance with an exemplary implementation.

FIG. 2 illustrates an exemplary configuration of a device 200. One or more devices 200 may correspond to or be included in devices in environment 100, such as UE device 110, wireless station 122, slice controller 132, router 134 and/or other devices included in environment 100. Referring to FIG. 2, device 200 may include bus 210, processor 220, memory 230, input device 240, output device 250 and communication interface 260. Bus 210 may include a path that permits communication among the elements of device 200. The exemplary configuration illustrated in FIG. 2 is provided for simplicity. It should be understood that device 200 may include more or fewer components than illustrated in FIG. 2.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as a keypad, a keyboard, a mouse, a pen, a microphone, a touch screen, voice recognition and/or biometric mechanisms, etc. Output device 250 may include a mechanism that outputs information to the user, including a display (e.g., a liquid crystal display (LCD)), a speaker, etc. In some implementations, device 200 may include a touch screen display may act as both an input device 240 and an output device 250.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data. Communication interface 260 may also include a modem or an Ethernet interface to a LAN or other mechanisms for communicating with elements in a network.

In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), solid state drive (SSD), etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
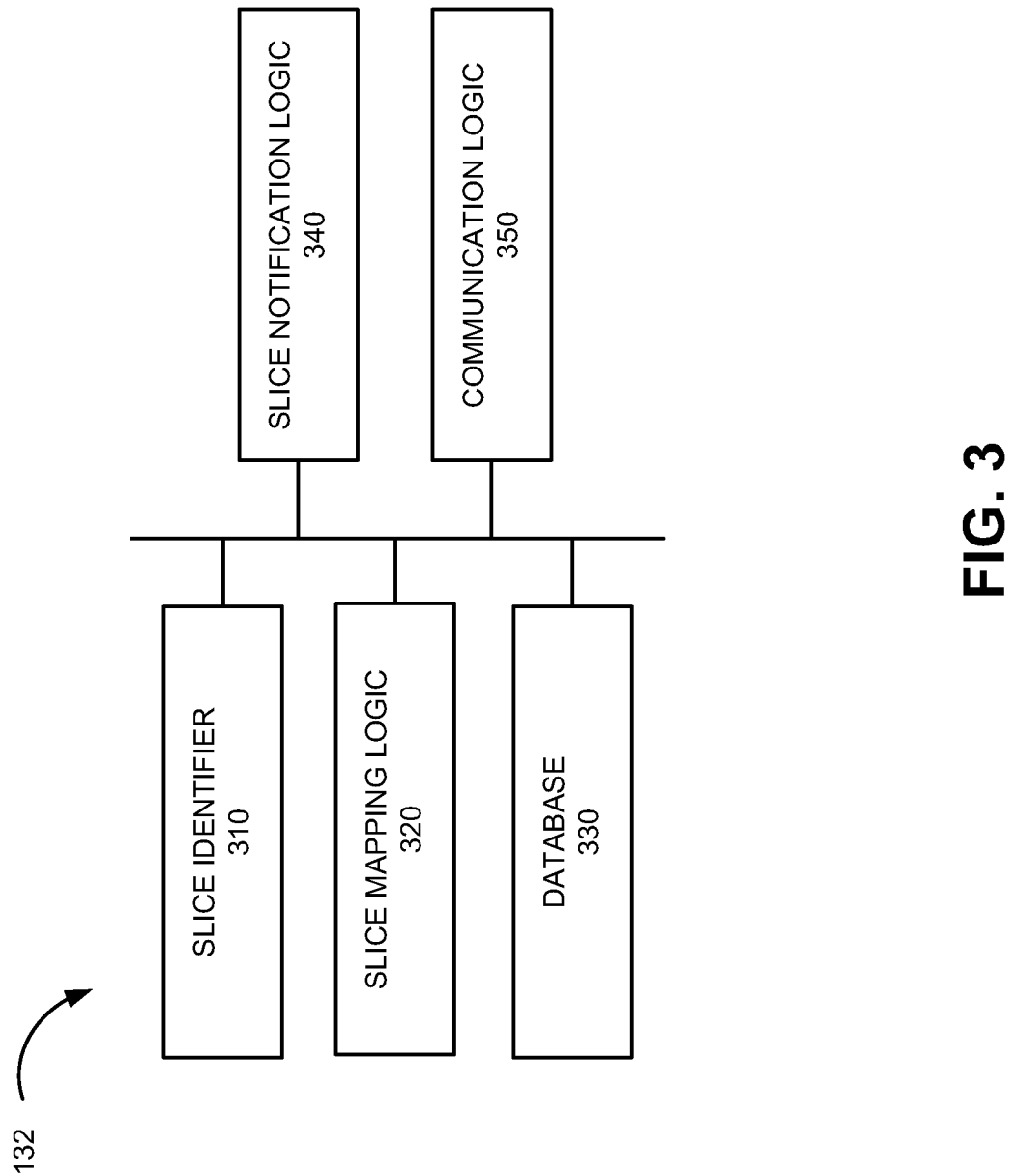
FIG. 3 illustrates logic components implemented in the slice controller of FIG. 1 in accordance with an exemplary implementation.

FIG. 3 is a block diagram of components implemented in slice controller 132 in accordance with an exemplary implementation. Referring to FIG. 3, slice controller 132 includes slice identifier 310, slice mapping logic 320, database 330, slice notification logic 340 and communication logic 350. These elements may be implemented by processor 220 executing instructions stored in memory 230 of slice controller 132. In alternative implementations, these components or a portion of these components may be located externally with respect to slice controller 132.

Slice identifier 310 may include logic to identify types of slices implemented in environment 100. For example, slice identifier 310 may identify slices that include a priority associated with the slice. For example, a slice may have a priority of 1, 2, 3, etc., with one being the highest priority. In other implementations, slice identifier 310 may identify slices based on particular SLA requirements and/or KPIs associated with the slice, such as a slice having a high bandwidth and low latency, a slice having a medium bandwidth with fast convergence and low jitter, etc. In one implementation, each slice may be identified by a slice ID. The slice ID may correlate to the particular priority associated with the slice, an SLA and/or various metrics associated with the slice. In each case, the slice ID may be used by elements in transport network 130 when recovering from a failure associated with the slice, as described in detail below.

Slice mapping logic 320 may include logic to map slices for different domains or portions of transport network 130 in environment 100. For example, in accordance with the Third Generation Partnership Project (3GPP), the slice ID may have a particular format, which may not be readable in all domains or routers 134 in transport network 130. For example, some routers 134 may be associated with a different network than other routers in transport network 130. In situations in which all domains and/or routers 134 in environment 100 may not be able to directly read or identify slice ID information, slice mapping logic 320 may map each slice ID to a domain specific identifier that is able to be read by routing devices, such as routers 134, located in the particular domain.

Database 330 may store slice IDs, priority information, SLA, QoS, KPIs, etc., associated with slices. For example, database 330 may store a slice ID, a priority, SLA and/or QoS requirements, as well as particular bandwidth, latency, jitter, etc., requirements for each slice used in environment 100. As additional slices are added in environment 100, database 330 may be dynamically updated to include the particular information for the newly added slices.

Slice notification logic 340 may include logic to provide slice information to routers 134 in transport network 130. For example, slice notification logic 340 may provide slice information, such as slice IDs, mapped slice IDs, etc., to routers 134 to enable the routers 134 to become aware of particular slices used in environment 100. The slice information may be transmitted from one router 134 to another router 134 via a transmission control protocol, such as an interior gateway protocol (IGP). Each router 134 may then use the slice information when prioritizing the identification of alternate paths and/or routes in transport network 130 when, for example, a failure occurs, as described in detail below.

Communication logic 350 may include logic for communicating with devices in environment 100 via wired, wireless or optical mechanisms. For example, communication logic 350 may transmit data, such as slice related information, to routers 134. Communication logic 350 may also receive information from devices in environment 100, such as devices in core network 150 providing information regarding slice information for slices implemented in environment 100. Communication logic 350 may also communicate with other devices in environment 100. For example, communication logic 350 may include one or more transceivers and one or more antennas for transmitting and receiving RF data, a modem or an Ethernet interface to a LAN or other mechanisms for communicating with elements in a network.

Although FIG. 3 shows exemplary components of slice controller 132, in other implementations, slice controller 132 may include fewer components, different components, differently arranged components, or additional components than depicted in FIG. 3. In addition, in other implementations, some or all of the components illustrated in FIG. 3 may be implemented in other devices, such as one or more devices implemented in core network 150.

Figure 4:
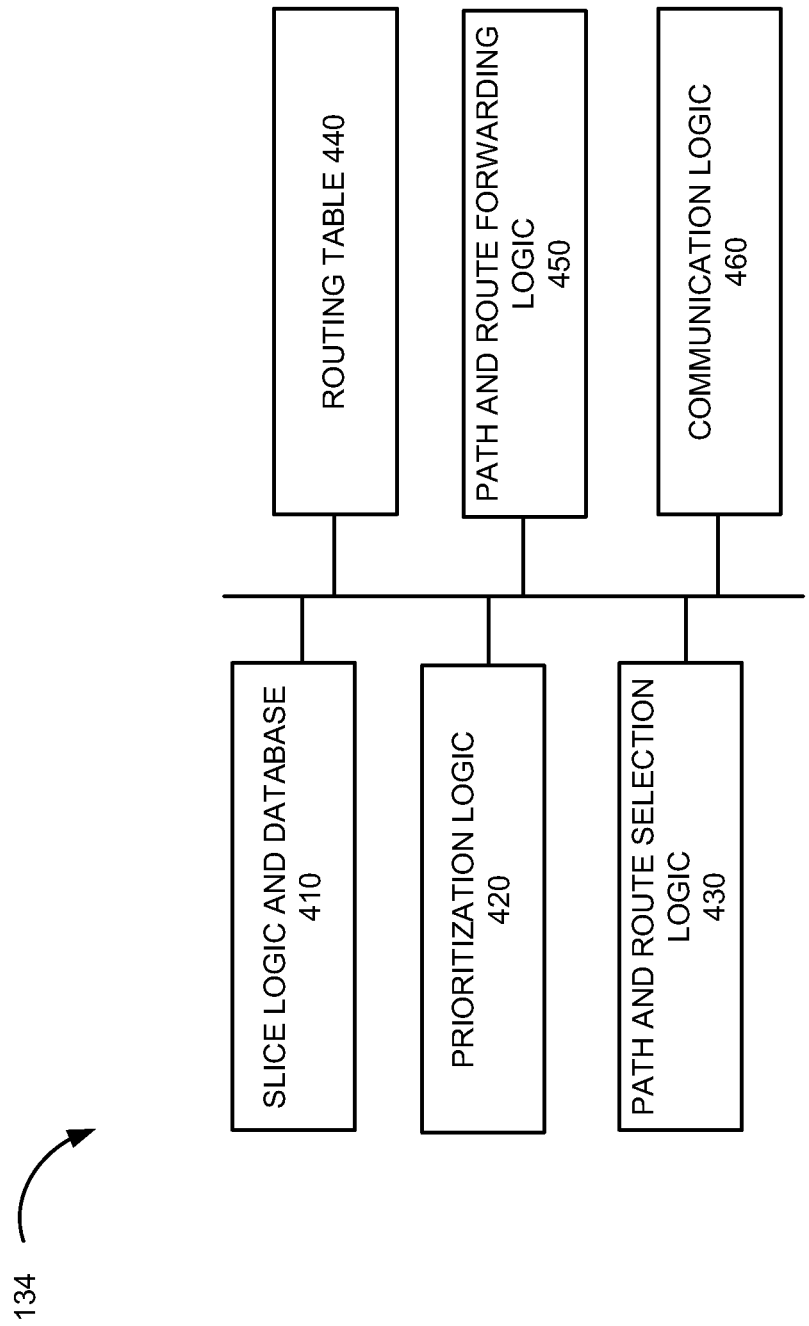
FIG. 4 illustrates logic components implemented in a router or other network device of FIG. 1 in accordance with an exemplary implementation.

FIG. 4 is a functional block diagram of components implemented in router 134 in accordance with an exemplary implementation. Referring to FIG. 4, router 134 includes slice logic and database 410, prioritization logic 420, path and route selection logic 430, routing table 440, path and route forwarding logic 450 and communication logic 460. These elements may be implemented by processor 220 executing instructions stored in memory 230 of router 134. In alternative implementations, these components or a portion of these components may be implemented via hard-wired logic.

Slice logic and database 410 may include logic configured to receive and store information regarding slices implemented in environment 100. For example, slice logic and database 410 may receive slice-related information from slice controller 132 and store the slice information. As described above, the slice information may include slice IDs, priorities associated with slices, SLA requirements associated with the slices, KPIs associated with the slices, etc. The slice information may be used by router 134 to establish alternate paths and routes in transport network 130 when a failure occurs, as described in detail below.

Prioritization logic 420 includes logic to identify priority information associated with slices. For example, prioritization logic 420 may access slice logic and database 410 when a failure occurs to identify whether a slice is associated with a path/route affected by a failure. If the failure affects a route/path associated with router 134, prioritization logic 420 may identify the priority associated with the path affected by the failure.

Path and route selection logic 430 may include logic configured to select an alternate path(s) when a failure occurs. In an exemplary implementation, path and route selection logic 430 may prioritize the selection and installation of an alternate path based on the priority associated with a particular slice. For example, if a failure occurs in a path associated with a slice having a priority of 1, path and route selection logic 430 may determine and install an alternate path for slice 1 prior to identifying and installing any other paths/routes affected by the failure, as described in detail below.

Routing table 440 may include a routing table used by router 134 to identify routes for forwarding data. The routes may be stored based on the configuration of routers 134 in transport network 130. In some implementations, routing table 440 may include pre-stored alternate routes associated with various paths/routes in transport network 130 in case a failure occurs. In other implementations, path and route selection logic 430 may identify new paths in transport network 130 in a dynamic manner and install (e.g., store the path and/or route information) the route in routing table 440.

Path and route forwarding logic 450 may forward information regarding alternate paths in transport network 130 as part of a convergence process. For example, in accordance with protocols executed by routers 134, routers 134 may exchange topology information regarding routes and paths in transport network 130. In an exemplary implementation, path and route forwarding logic 450 may forward information identifying an alternate path to, for example, router 134-N or other routers in transport network 130.

Communication logic 460 may include one or more transceivers or network interfaces that router 134 uses to communicate with other devices via wired, wireless or optical mechanisms. For example, communication logic 460 may include one or more transmitters, receivers and/or transceivers for transmitting and receiving data. Communication logic 460 may also include a modem, an antenna or an Ethernet interface to a LAN or other mechanisms for communicating with elements in a network.

Although FIG. 4 shows exemplary components of router 134, in other implementations, router 134 may include fewer components, different components, differently arranged components, or additional components than depicted in FIG. 4.

Figure 5:
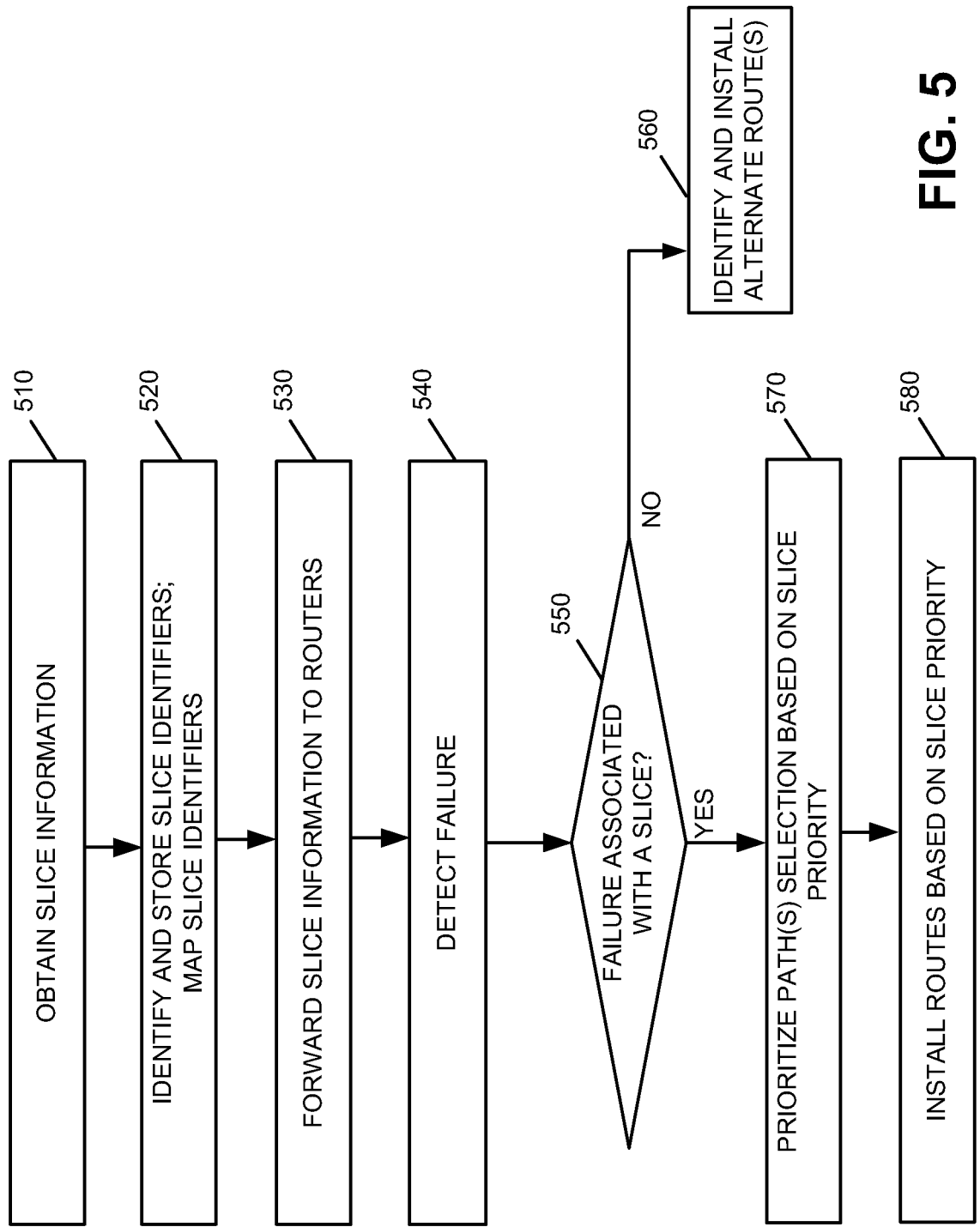
FIG. 5 is a flow diagram illustrating processing associated with slice-based recovery in accordance with an exemplary implementation.

FIG. 5 is a flow diagram illustrating processing associated with slice-based recovery in environment 100 in accordance with an exemplary implementation. Processing may begin with slice controller 132 obtaining information regarding slices used in environment 100 (block 510). For example, slice controller 132 may communicate with upstream devices in environment 100, such as devices in core network 150, to obtain information identifying slices used in environment 100. Alternatively, personnel associated with operating transport network 130 and/or core network 150 may provide slice information to slice controller 132 for storage in slice controller 132. As described above, the slice information may include slice IDs associated with the slices used to transmit data to/from UE device 110 from/to a destination in core network 150 and a priority associated with each slice ID. The slice IDs may correspond to requirements associated with SLA, bandwidth, latency, jitter, etc. The priority associated with each slice may also identify whether a fast convergence is needed for a particular slice and/or other KPIs associated with the slice. In other implementations, the slice ID may correspond to a priority associated with the slice, such as priority 1, priority 2, priority 3, etc., where priority 1 is the highest priority.

In each case, slice controller 132 may identify the slice IDs associated with the obtained slice information and store the slice IDs in, for example, database 330 (block 520). In some implementations, slice controller 132 may also map the slice IDs (block 520). For example, as described above, the slice ID may have a particular format that may not be readable in all domains. In such cases, slice controller 132 maps the slice IDs to domain-specific format and/or language to provide relevant slice ID information to network elements (e.g., routers 134) located in different domains of environment 100.

Slice controller 132 may forward the slice ID and/or mapped slice ID to routers 134 and/or other network devices associated with routing data in transport network 130 (block 530). For example, slice controller 132 may forward the slice information/mapped slice information to routers 134 via a transmission control protocol, such as IGP or another protocol. Routers 134 receive the slice information and store the slice information in slice logic and database 410 for use in identifying alternate paths when a failure occurs, such as a link failure, router failure, etc. Routers 134 may also forward the slice information to other routers 134 in transport network 130 via IGP or another protocol such that all routers 134 in transport network 130 receive the slice information.

Assume that one or more of routers 134 in environment 100 detects a failure (block 540). For example, referring to FIG. 6, assume that router 134-1 detects a failure in link 136 coupling router 134-1 to router 134-2, as illustrated by the break in the line connecting router 134-1 to 134-2. The failure may be detected using, for example, bidirectional forwarding detection (BFD), such as router 134-1 not receiving a response to a message sent to router 134-2 within a preset time limit, or by some other mechanism. The failure may correspond to a hardware failure, software failure or some other type of failure. Router 134-2 may also detect a failure in link 138 coupling router 134-2 to router 134-5. Router 134-1 and 134-2 may communicate the identified failures to other routers in transport network 130 via IGP or another protocol.

Figure 6:
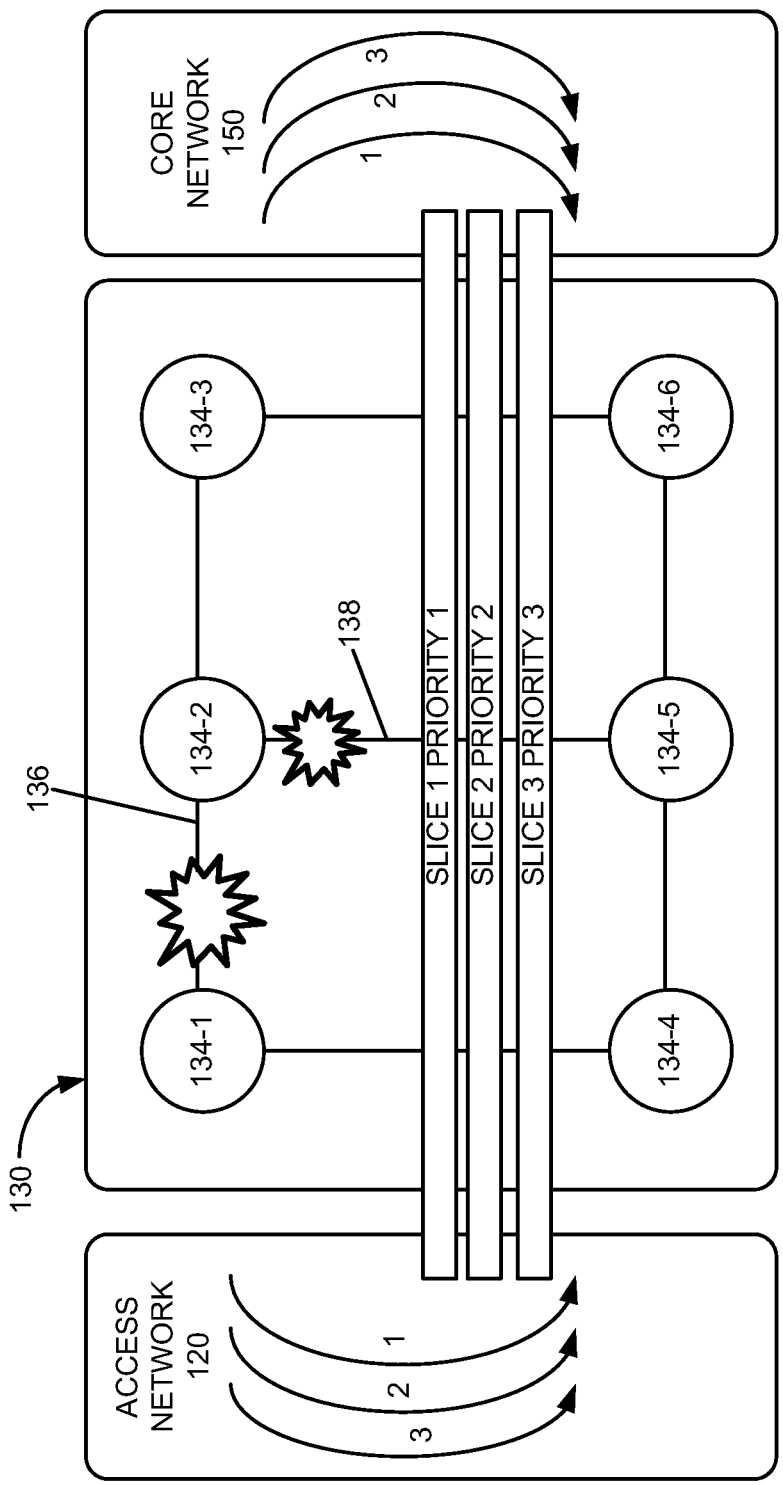
FIG. 6 illustrates a failure in the environment of FIG. 1.

In this example, further assume that each router 134 stores information identifying three slices used in transport network 130 to route data from access network 120 to core network 150 via transport network 130, shown as slice 1, slice 2 and slice 3 illustrated in FIG. 6. Further assume that slice 1 has a priority of 1, slice 2 has a priority of 2 and slice 3 has a priority of 3, where priority 1 indicates the highest priority. Router 134-1 may determine if the destination address for the traffic transmitted via link 136 and/or link 138 is associated with a slice (block 550). For example, slice logic and database 410 in router 134-1 may determine if the failure in link 136 affects network slices 1, 2 or 3 used to forward data in transport network 130.

If slice logic and database 410 determines that the failures in links 136 and 138 are not associated with network slices 1, 2 or 3 (block 550—no), router 134 may identify an alternate paths and routes in transport network 130 without regard to any slice priority (block 560). For example, path and route selection logic 430 may identify one or more alternate paths in a random manner and install the alternate paths in routing table 440 included in router 134-1 (block 560). In other instances, router 134-1 may pre-store alternate paths to route data traffic in transport network 130. After the alternate paths are identified, path and route forwarding logic 450 in router 134-1 may forward the new path to other routers 134 in transport network 130 via a transmission protocol, such as IGP. Once the alternate route is installed in routing table 440 of router 134-1 and any other routers 134 affected by the failure, router 134-1 may use the alternate route to forward data in transport network 130.

If, however, router 134-1 determines that the failure is associated with a network slice used to forward data to a destination address (block 550—yes), router 134-1 may identify the slice ID and/or requirements associated with the slice ID, such as the priority associated with the slice. Alternatively, router 134-1 may determine the SLA, QoS, bandwidth, delay, jitter, convergence requirements, etc., associated with the slice. For example, assume that slices 1, 2 and 3 are associated with routes that include link 136. In this case, slice logic and database 410 identifies the three slices. Prioritization logic 420 of router 134-1 may then prioritize the selection and installation of new paths for each of slices 1, 2 and 3 (block 570). For example, prioritization logic 420 may determine that an alternate path for slice 1 is to be identified first, followed by identifying an alternate path for slice 2 and then identifying an alternate path for slice 3. Other alternate paths not included in a slice may then be identified in a random manner or some other manner after a path for slices 1, 2 and 3 are identified and installed in routing table 440 of router 134-1.

In this example, assume that slice 1 was associated with a path from router 134-1 to router 134-2 to router 134-3. Further assume that router 134-1 identifies an alternate path to avoid the failure in link 136 by selecting a path from router 134-1 to router 134-4, to router 134-5 to router 134-6. Router 134-1 may prioritize the installation of the route from router 134-1 to router 134-4 by storing the route in routing table 440 (block 580). Router 134-1 may also forward the new path information for slice 1 to router 134-4, which may also prioritize the installation of any necessary routes, such as prioritize the installation of a path from router 134-4 to router 134-5. Routers 134-5 and 134-6 may similarly prioritize the installation of any new paths and routes for slice 1 and install the new path(s) in their respective routing tables 440.

After the new path and route are installed for slice 1, router 134-2 may prioritize the selection and installation of any new paths and routes for Slice 2, having a priority of 2. Further, after the new routes and paths are installed for Slice 2, router 134-1 may select and install the new paths/routes for Slice 3. Once the paths and routes associated with re-routing data to avoid the failed link 136, transport network 130 may transmit data to the destination. For example, assume that the failure associated with Slice 1 involved accessing a website associated with company XYZ.com. Once the new paths and routes have been selected and installed in routing table 440 of the appropriate routers 134, UE device 110 may access website XYZ.com. After the new paths/routes for the network slices affected by the failure have been installed, router 134-1 may install routes not associated with slices in environment 100 in routing table 440.

In this manner, transport network 130 is able to prioritize the recovery associated with failures in a network based on slice-related information. Such priority-based processing may enable the service provider to meet requirements associated with particular users of data services.

Implementations described provide for slice aware recovery in a network, such as a transport network used to route traffic from an access network to a core network. This may allow a service provider to meet SLA and/or other requirements associated with data services, even when a failure associated with a network slice occurs. Providing priority-based slice recovery may also provide for faster convergence of all routers in the transport network.

The foregoing description of example implementations provides illustration and description, but is not intended to be exhaustive or to limit the embodiments to the precise form disclosed. Modifications and variations are possible in light of the above teachings or may be acquired from practice of the embodiments.

For example, features have been described above with respect to providing slice-based recovery in a transport network. In other implementations, similar processing may be performed in core network 150 and/or access network 120

In addition, features have been described above as selecting and installing new routes based on the priority associated with a slice. In situations in which more than one slice is affected by the failure and multiples ones of the affected slices have a same priority, routers 134 may select and add routes for the particular priority on a random basis, based on a position of the slice ID within database 330, based on when the slices have been implemented in environment 100, or some other metric, such as the particular entity/user associated with the slice. In some implementations, a slice ID may identify additional information that indicates whether a slice should be given a higher priority over slices having the same priority. Such information may be stored in a sub-field associated with the slice ID.

Further, while series of acts have been described with respect to FIG. 5, the order of the acts may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   identifying a plurality of network slices associated with transmitting data in a network;
   determining, by a routing device, that a failure associated with a path used to transmit data has occurred, wherein the failure corresponds to a failure of a link in the path or a failure of a router in the path;
   determining, by the routing device, whether the failure is associated with one of the plurality of network slices; and
   prioritizing, by the routing device, a route selection process to identify an alternate path in response to determining that the failure is associated with one of the plurality of network slices.

2. The method of claim 1, further comprising:
   forwarding, by a network device, information identifying the plurality of network slices to the routing device.

3. The method of claim 2, further comprising:
   forwarding, by the routing device, the information identifying the plurality of network slices to at least one other routing device.

4. The method of claim 1, further comprising:
   determining that the failure is associated with a first network slice having a first priority, and wherein the prioritizing comprises:
   identifying, by the routing device, at least one alternate route associated with the first network slice prior to identifying alternate routes associated with paths not having the first priority.

5. The method of claim 4, wherein the prioritizing further comprises:
   storing, by the routing device and in a routing table, at least one route associated with the first network slice affected by the failure prior to storing other routes not associated with the first network slice.

6. The method of claim 4, wherein the prioritizing further comprises:
   installing, by the routing device and in a routing table, routes associated with network slices affected by the failure, prior to installing other routes based on at least one of a priority, service level agreement (SLA) information, quality of service (QOS) information or a convergence metric associated with the network slices.

7. The method of claim 1, wherein each of the plurality of network slices has a corresponding slice identifier (ID), the method further comprising:
   mapping, by the network device, the slice ID associated with a first one of the plurality of network slices into a format readable by the routing device; and
   forwarding, by a network device, the mapped slice ID to the routing device.

8. The method of claim 1, wherein the prioritizing comprises:
   receiving, from a network device, information identifying the plurality of network slices; and
   storing, by the routing device, the information identifying the plurality of network slices.

9. The method of claim 1, further comprising:
   forwarding, by the routing device, a selected route associated with a first one of the plurality of network slices to another router associated with the first slice.

10. The method of claim 1, further comprising:
    identifying a new path to transmit data associated with a first one of the network slices associated with the failure prior to identifying new paths associated with the failure and not associated with a network slice.

11. A system, comprising:
    a first device comprising a processor, wherein the first device is configured to:
       store information identifying a plurality of network slices associated with transmitting data in a network, and
       forward the information to other devices in the network; and
    a routing device configured to:
       receive the information identifying the plurality of network slices from the first device,
       determine that a failure associated with a path used to transmit data has occurred, wherein the failure corresponds to a failure of a link in the path or a failure of a router in the path,
       determine whether the failure is associated with one of the plurality of network slices; and
       prioritize a route selection process to identify an alternate path in response to determining that the failure is associated with one of the plurality of network slices.

12. The system of claim 11, wherein the routing device is further configured to:
    forward the information identifying the plurality of network slices to at least one other routing device.

13. The system of claim 11, wherein the routing device is further configured to:
    determine that the failure is associated with a first network slice having a first priority, and when prioritizing, the routing device is further configured to:
    identify at least one alternate route associated with the first network slice prior to identifying alternate routes associated with paths not having the first priority.

14. The system of claim 13, wherein when prioritizing, the routing device is further configured to:
    store, in a routing table, the at least one alternate route associated with the first network slice prior to storing other routes in the routing table.

15. The system of claim 11, wherein the routing device is further configured to:

install, in a routing table, routes associated with network slices affected by the failure, prior to installing other routes based on at least one of a priority, service level agreement (SLA) information, quality of service (QOS) information or a convergence metric associated with the network slices.

16. The system of claim 11, wherein each of the plurality of network slices has a corresponding slice identifier (ID), and wherein the first device is further configured to:

map the slice ID associated with a first one of the plurality of network slices into a format readable by the routing device, and forward the mapped slice ID to the routing device.

17. The system of claim 11, wherein the routing device is further configured to:

forward a selected route associated with a first one of the plurality of network slices to another routing device associated with the first network slice.

18. A routing device, comprising:

a memory configured to store information identifying a plurality of network slices associated with transmitting data in a network; and processing logic configured to:

determine that a failure associated with a path used to transmit data has occurred, wherein the failure corresponds to a failure of a link in the path or a failure of a router in the path, determine whether the failure is associated with one of the plurality of network slices, and prioritize a route selection process to identify an alternate path in response to determining that the failure is associated with one of the plurality of network slices.

19. The routing device of claim 18, wherein the processing logic is further configured to:

determine that the failure is associated with a first network slice having a first priority, and when prioritizing, the processing logic is further configured to:

identify at least one alternate route associated with the first network slice prior to identifying alternate routes associated with paths not having the first priority.

20. The routing device of claim 18, wherein the routing device further comprises:

a routing table, and wherein the processing logic is further configured to:

install, in the routing table, routes associated with network slices affected by the failure, prior to installing other routes in the routing table based on at least one of a priority, service level agreement (SLA) information or quality of service (QOS) information associated with the network slices.

* * * * *